July 5, 1949.    W. C. SUTTON    2,475,264
FLEXIBLE BELT
Filed March 20, 1944    2 Sheets-Sheet 1
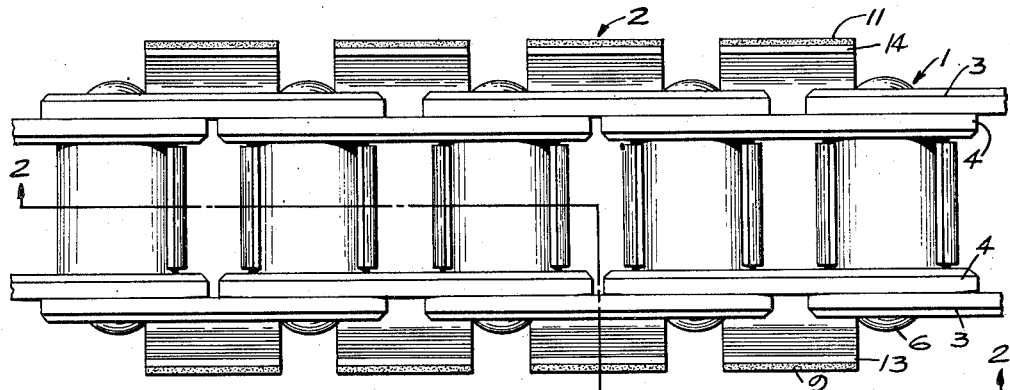
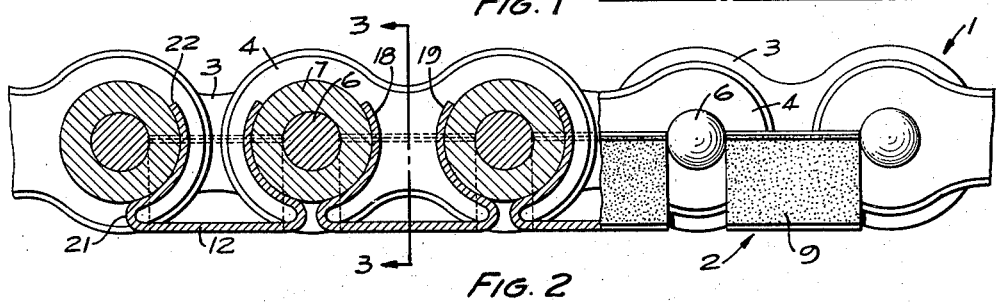
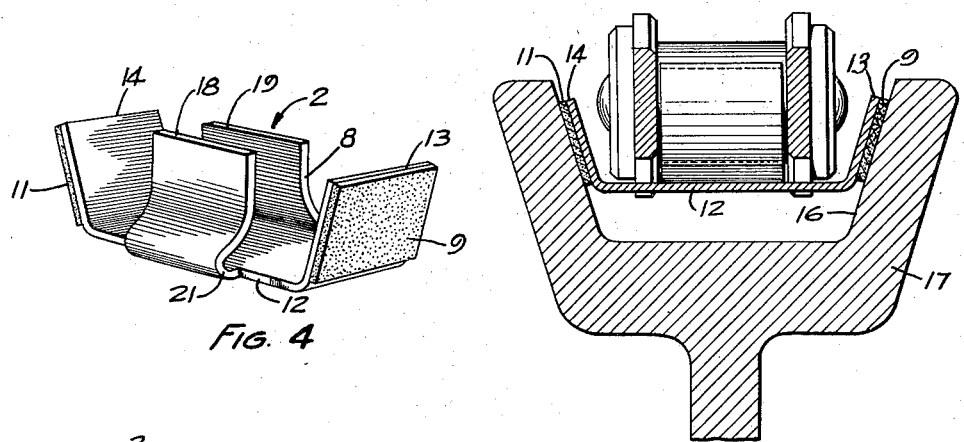
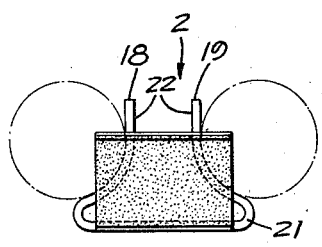
INVENTOR:
Walter C. Sutton
BY
C. Thomas Cox
ATTORNEY.

July 5, 1949.  W. C. SUTTON  2,475,264
FLEXIBLE BELT

Filed March 20, 1944  2 Sheets-Sheet 2

INVENTOR:
Walter C. Sutton
BY
C. Thomas Cox
ATTORNEY

UNITED STATES PATENT OFFICE 2,475,264

FLEXIBLE BELT

Walter C. Sutton, Shaker Heights, Ohio, assignor to The S. K. Wellman Company, Cleveland, Ohio, a corporation of Ohio Application March 20, 1944, Serial No. 527,215

4 Claims. (Cl. 74—236)

This invention relates to a new and improved flexible belt or chain which is provided with friction surfaces at the sides thereof for engagement with a machine element such as a pulley. The improved belt is adapted to be used as a friction driving member or as a braking member to slow down the rotation of machine elements.

Rubber, leather, and other nonmetallic belts have long been used as driving and braking elements in machinery and the advent of the so-called V-belt has greatly increased their application. These nonmetallic belts have certain disadvantages, however, in that they are of limited load carrying capacity and are liable to stretch in use requiring constant adjustment. Furthermore, it has not been found practical to use such nonmetallic V-belts as braking members to slow down and stop rotating elements.

The present invention aims to produce a V-belt of metallic construction that will carry heavy loads and can be used either as a driving or as a braking element.

It is therefore an object of the present invention to produce a new and improved flexible belt of metallic construction that is adapted to sustain relatively heavy driving and braking loads and yet one that is readily and economically produced.

It is a further object of my invention to produce an easily applied attachment for flexible chains so that they can be used as a V-belt driving or braking member.

Other and further objects will be apparent from the following description taken in conjunction with the accompanying drawings in which:

Fig. 1 shows a plan view of a conventional roller chain provided with the attachments of my invention;

Fig. 2 is a vertical section on line 2—2 of Fig. 1;

Fig. 3 is a sectional view on line 3—3 of the roller chain of Fig. 2 but showing the same in position on a V-pulley;

Fig. 4 is a perspective view of the attachment;

Fig. 5 is a side view of the attachment with the rollers of the chain shown in dotted lines;

Figure 6:
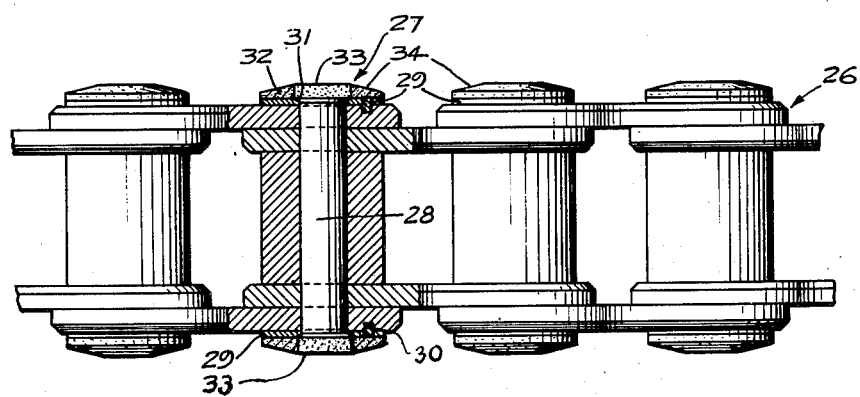
Fig. 6 is a plan view of a modified form of roller chain.

Referring now to the drawings in which like numerals are used to designate like parts, in Figs. 1 and 2, I have generally designated a conventional roller chain at 1 and the friction member generally at 2. The chain is made up of pairs of outside link plates 3 and pairs of inside link plates 4 joined by the usual pins 6 which also carry the rollers 7. Normally a thin bushing is disposed between each roller and pin, but this has been omitted in order to avoid confusion in the drawings. As is well-known, the connected pairs of outside links 3 and inside links 4 together with the pins 6 and rollers 7 cooperate to form a chain that is capable of flexible movement in a plane at right angles to the pins 6, the rollers 7 being spaced apart to provide for the reception of the teeth of a sprocket wheel.

As shown in Fig. 4, the friction member comprises a backing member 8 of solid metal such as sheet steel and friction surfaces 9 and 11. The backing member comprises a flat base portion 12 provided with four upstanding portions. At the ends of the base are disposed the upwardly extending end members 13 and 14 to the outer faces of which are secured the friction facings 9 and 11. As is clear from Fig. 3, the upstanding members 13 and 14 are disposed at an angle with respect to the base 12. This angle is the same as that of the inner faces 16 of the conventional V-pulley 17 as shown in Fig. 3.

Extending upwardly from the center of the base portion 12 are the oppositely curved members 18 and 19 which are adapted to engage adjacent rollers 7 of the chain to maintain the attachment in place. As shown in Figs. 4 and 5, these members 18 and 19 are extensions of the base 12, being provided with rounded junction portions 21 and vertical portions 22, and are of less width than the length of the base portion 12 so as to provide space between the members 18 and 19 and the upstanding members 13 and 14 for reception of the side links of the roller chain. The attachment as produced has the form shown in Figs. 4 and 5. In Fig. 5, the attachment is shown at the time of insertion in place between the rollers of the chain. After insertion, the upstanding portions 22 of the members 18 and 19 are swaged over so as to conform to the curvature of the rollers, achieving the final configuration shown in Fig. 2.

Although in Figs. 1 to 5, the upstanding portions 18 and 19 are curved so as to fit the adjacent sides of adjacent rollers, it is apparent that the members may be reversely curved and so dimensioned as to embrace the outer sides of adjacent rollers so as to clamp the rollers between the portions rather than to place the portions between the rollers as shown.

In the example selected, the base 12 together with the four upstanding portions 13, 14, 18, and 19 comprise a one-piece stamping which is bent to the shape illustrated, but it is apparent that a multipart construction can be used.

The friction facings 9 and 11 comprise sintered mixtures of metallic and nonmetallic powders integrally brazed or bonded to the face of each upstanding portion 13 and 14, although it is apparent that the friction facings may instead be brazed or bonded to separate sheet metal backings which are in turn secured to the upstanding portions 13 and 14.

The facings may be composed of any suitable metal powder mixture having the requisite strength and frictional properties for the particular application involved. One mixture that is suitable comprises:

| | |
|---|---|
| Cu | 67 |
| Sn | 5 |
| Pb | 9 |
| Fe | 7 |
| C | 7 |
| SiO$_2$ | 5 |

This mixture may be pressed and sintered and brazed to the upstanding portions in any suitable manner. I have found that the following process is suitable for producing the friction element of Figs. 4 and 5.

The sheet metal backing member 8 comprising the base portion 12 and the upstanding portions 13, 14, 18, and 19 is cut from a flat sheet as by stamping. It is then suitably cleaned and given a thin electroplating of copper to a thickness of about .0002". A metal powder mixture such as given above is pressed under a pressure of 11 tons per square inch to form thin briquettes of the size of the facings desired. Two facings are then placed on the stamped backing member 8 and held there under a pressure of about 100 pounds per square inch while the whole is heated to a temperature of from 1400° F. to 1600° F., preferably 1450° F., for a sufficient length of time to sinter the mixture and to cause it to braze or bond to the sheet metal backing member. After this is accomplished, the flat sheet metal backing member with the facings secured thereto is formed to the configuration shown in Fig. 4.

The exact dimensions of the attachment 2 and of the angles of inclination of the upstanding portions 13 and 14 will vary according to the size of the roller chain selected. However, these roller chains are of standard construction and dimensions and there are relatively few sizes in commercial use so that a small assortment of sizes of attachments will suffice for general use.

From the above description, it is apparent that the attachment 2 cooperates with the roller chain 1 to produce a flexible belt having friction surfaces located at the sides thereof. The whole construction is metallic and is capable of sustaining relatively heavy loads. The flexible chain can be used as a conventional drive for V-type pulleys, but I have found that it is particularly effective in certain special applications. The flexible belt is of use in braking applications running in oil and is very useful in adjustable speed drives in which the tension of the belt is utilized to force apart the sides of the V of a special pulley to permit the belt to attain a smaller radius on the pulley and a consequent change in speed.

It is apparent that my general idea is capable of other forms and embodiments than that shown in Figs. 1-5 and that it is merely essential to provide a flexible metallic belt having metallic friction elements providing friction surfaces at the sides of the belt. Thus, in Figs. 6 and 7, I have illustrated a modification in which the conventional roller chain 26 is modified by providing friction members or washers generally designated at 27. In this construction, the special pins 28 replace the usual pins of the chain and serve to retain the friction members 27 in position. These friction members comprise a thin solid metal backing member 29 having a counter sunk hole 31 for reception of the pin 28. Integrally bonded to the outer face of the backing member 29 is a sintered metal friction facing 32 having a hole 33 through the center thereof in alignment with the outer diameter of the counter sunk portion of the backing member 29.

The facing 32 is of truncated cone construction and has an inclined face 34. The angle of this face is approximately the same as the angle of the side flange of the V-pulley in which the belt is to engage.

In order to prevent rotation of the friction members 27, a locking pin 30 is placed in aligned holes in the sheet metal backing 29 and outer links of the chain.

Figure 8:
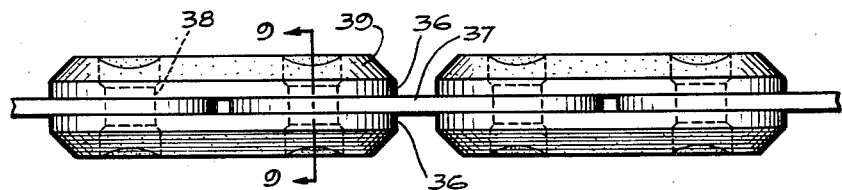
Fig. 8 is a plan view of a further modification.
Figure 9:
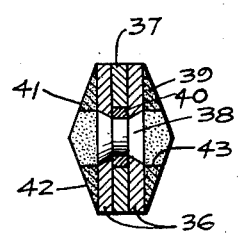
Fig. 9 is a section on line 9—9 of Fig. 8.

In Figs. 8 and 9, I have illustrated a further modification in which the flexible belt is made from a series of pivotally connected links as distinguished from a roller chain. Pairs of outside links 36 are pivotally connected by inside links 37 through the medium of pins 38. The outside links 36 are provided with friction members comprising facings 39 of sintered powder metal which are integrally secured as by brazing or welding to the outer faces of the links. As is clear from Fig. 9, these sintered facings are triangular prisms having inclined faces 41, 42 which are disposed at an angle corresponding to the angle of the faces of the pulley. These facings 39 are provided with holes 43 for reception of the heads of the counter sunk pins 38.

Figure 7:
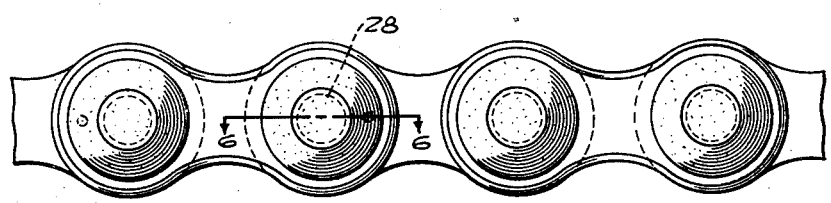
Fig. 7 is a side elevation of Fig. 6.

It is apparent that the modifications shown in Figs. 6 and 8 have the added advantage that the flexible belt shown is capable of reverse operation. Due to the fact that the friction facings are symmetrical in cross section, the flexible belt may be used in applications in which it passes around one pulley, and then passes around another pulley, the centers of the two pulleys being on opposite sides of the belt. Such an operation is not possible with the structure of Figs. 1 to 3, nor with the usual nonmetallic V-belt.

In the construction shown in Figs. 8 and 9, the friction members 39 are brazed directly to the outside links, but it is apparent that they can instead be brazed to separate sheet metal backing members which are in turn secured to the links by riveting or brazing.

Generally, the flexible belt of my invention is not applicable to pulleys of small diameter since the friction surfaces of the friction members are not too well adapted to mate with a conical surface; however, it is apparent that after a short wearing-in period, the friction surfaces will mate satisfactorily with the machine element which the belt is adapted to engage.

While I have illustrated several modifications of my invention, it is apparent that other and further modifications will occur to those skilled in the art.

I claim:

1. A flexible belt comprising alternate pairs of inner and outer links, pins and rollers pivotally connected about said links to form a link and roller chain capable of flexible movement in a plane, a friction drive member carried by each pair of links, each member comprising a base portion of solid metal having upwardly extending, oppositely curved arms embracing adjacent rollers of the chain and outwardly and upwardly extending arms disposed at the outer sides of said links, said last mentioned arms being provided with an outer facing of sintered metal powder.

2. An attachment for a link and roller chain comprising a substantially rectangular base member, end members extending upwardly and outwardly from the ends of the base member and having a sintered metal facing on the outer sides thereof, and side members extending upwardly from the sides of the base member and adapted to engage adjacent rollers of a link and roller chain, each said side member being of lesser width than the length of said base member and disposed centrally of said sides of the base member.

3. A flexible belt comprising alternate pairs of inner and outer links, pins and rollers pivotally connected about said links to form a link and roller chain capable of flexible movement in a plane, a friction drive member carried by each pair of links, each member comprising a base portion of solid metal having upwardly extending, oppositely curved arms embracing adjacent rollers of the chain and outwardly and upwardly extending arms disposed at the outer sides of said links, said last mentioned arms being provided with an outer facing of friction material.

4. An attachment for a link and roller chain comprising a substantially rectangular base member, end members extending upwardly and outwardly from the ends of the base member and having a friction facing on the outer sides thereof, and side members extending upwardly from the sides of the base member and adapted to engage adjacent rollers of a link and roller chain, each said side member being of lesser width than the length of said base member and disposed centrally of said sides of the base member.

WALTER C. SUTTON.

REFERENCES CITED

The following references are of record in the file of this patent:

UNITED STATES PATENTS

| Number | Name | Date |
| --- | --- | --- |
| 959,532 | Holsman | May 31, 1910 |
| 1,424,768 | Mesinger | Aug. 8, 1922 |
| 1,476,603 | Firminger | Dec. 4, 1923 |
| 2,178,527 | Wellman | Oct. 31, 1939 |

FOREIGN PATENTS

| Number | Country | Date |
| --- | --- | --- |
| 278,164 | Germany | Sept. 30, 1914 |
| 327,694 | Great Britain | Apr. 8, 1930 |